United States Patent [19]

Givens

[11] 4,204,676

[45] May 27, 1980

[54] BACK EXERCISER

[76] Inventor: Edmond W. Givens, 724 Stella St., Vallejo, Calif. 94590

[21] Appl. No.: 862,684

[22] Filed: Dec. 21, 1977

[51] Int. Cl.² ............................................. A63B 21/04
[52] U.S. Cl. .................................... 272/136; 272/142
[58] Field of Search ............... 272/142, 136, 130, 135, 272/DIG. 4, 138; 128/25 R

[56] References Cited

U.S. PATENT DOCUMENTS

| | | | |
|---|---|---|---|
| 2,815,020 | 12/1957 | Barkschat | 128/25 R |
| 3,421,760 | 1/1969 | Freeman | 272/142 |
| 3,701,529 | 10/1972 | Kruthaupt | 272/138 |
| 3,754,547 | 8/1973 | Walker | 272/135 X |
| 3,768,808 | 10/1973 | Passera | 272/DIG. 4 X |

FOREIGN PATENT DOCUMENTS 176915  10/1906  Fed. Rep. of Germany ........... 272/138

*Primary Examiner*—William R. Browne
*Attorney, Agent, or Firm*—George B. White

[57] ABSTRACT

The principle of the back exerciser is a pedal held in an initial position by elastic strips and a back brace and side handles in such relation that the person pressing on the side handles and bracing his back against the back brace, repeatedly pressing his heels on the pedal against the action of the elastic strips, exercises his back muscles. The structure is a skeleton frame with a pivoted pedal having its rear edge raised by elastic strips toward a back frame so that the elastic strips pull the back edge of the pedal upward and the front edge downward against a stop holding the pedal in a horizontal position. On the back frame at a suitable height is a padded back brace for the person to bear against when he presses the pedal down against the action of the elastic strips.

9 Claims, 3 Drawing Figures

U.S. Patent      May 27, 1980      4,204,676
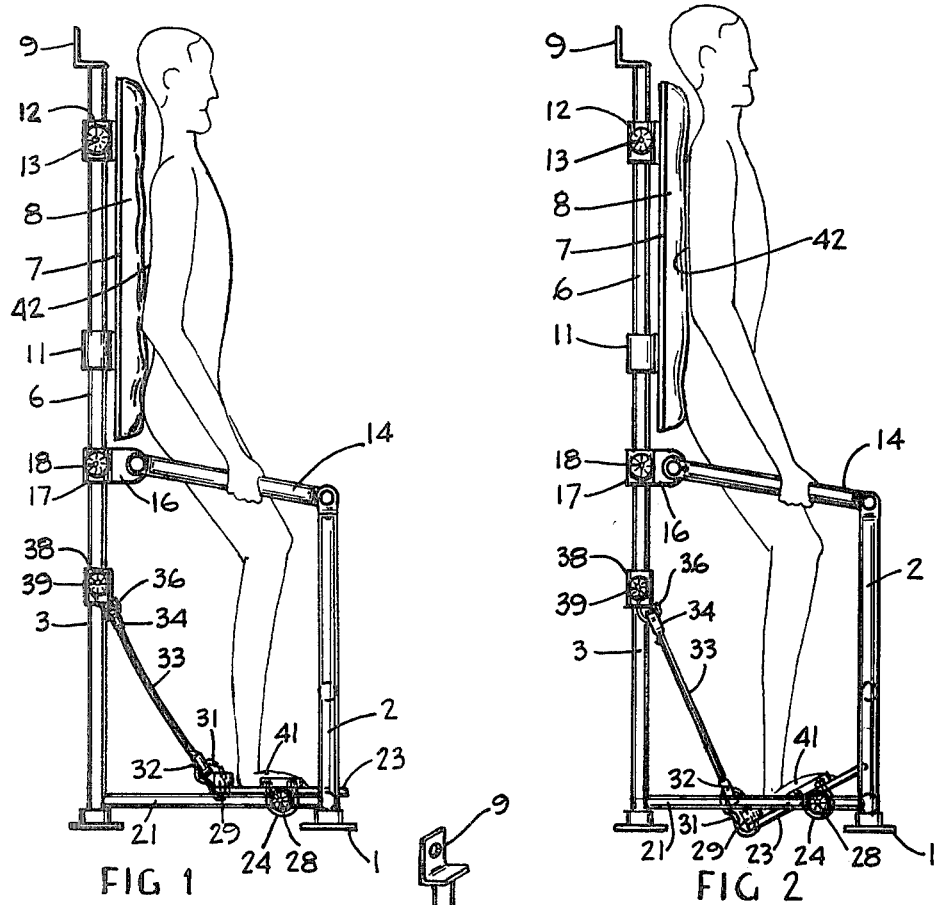
FIG 1
FIG 2
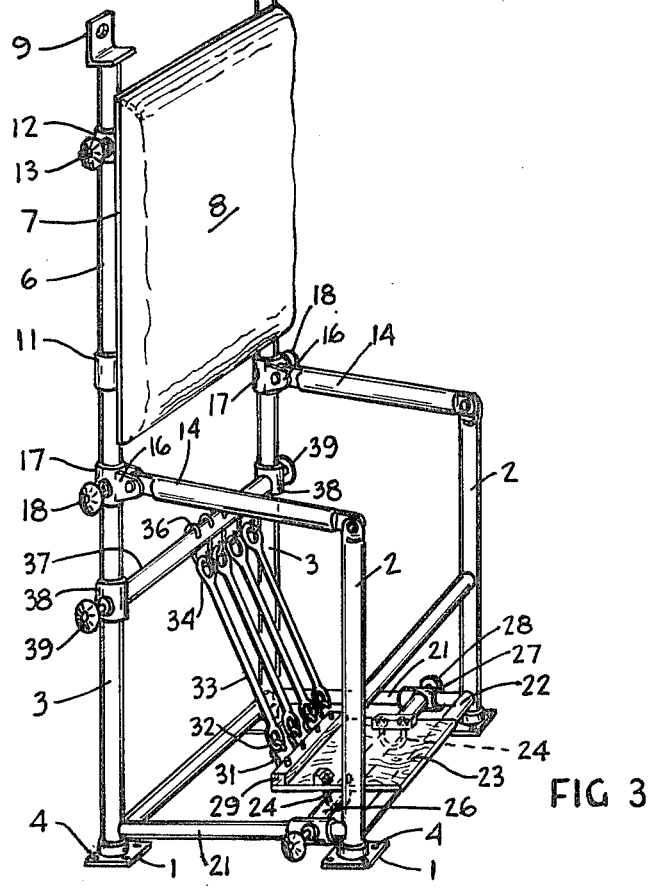
FIG 3

BACK EXERCISER

BACKGROUND OF THE INVENTION

In the prior art exerciser devices are known which use pedal boards pressed against the pull of strings such as in U.S. Pat. No. 3,702,529.

The primary object of this invention is to provide an apparatus, wherein handles, resiliently held pedal and a back brace are so related that a person simultaneously bearing against said elements inevitably exercises the lower muscles of his back.

BRIEF DESCRIPTION OF THE DRAWINGS

FIG. 1 is a side view of the exerciser with the outlines of the person in a relaxed attitude.

FIG. 2 is a side view of the exerciser showing the person in a back bracing attitude and FIG. 3 is a perspective view of the structure of the exerciser.

DETAILED DESCRIPTION

The device has a suitable base. For purposes of illustration flanges 1 on the lower ends of front legs 2 and back legs 3 rest on the floor and are provided with suitable holes 4 for attaching the flanges 1 to the floor if so desired. The back legs 3 extend upward above the top of the front legs to a substantial distance to provide back supports bars 6.

A back plate 7 is attached to the back supports bars 6. A padding 8 covers the back plate 7. Suitable top flanges 9 on the tops of the back supports 6 may be used to secure the frame to a perpendicular surface such as a wall if so desired.

The back plate 7 is adjustably secured to the back support bars 6. In this illustration a sleeve 11 on the back plate 7 is slidable on each back bar 6. A second or upper sleeve 12 on the plate 7 is also slidable on each back bar 6 and it is held in an adjusted position by a suitable set screw 13.

Handle bars 14 are pivoted at their front ends to the tops of the respective front legs 2 and their rear ends are pivotally connected to flanges 16 on respective sleeves 17 slidable on the back bars 6. Set screws 18 secure the sleeves 17 in adjusted position on the back legs 3.

Above the flanges 1 are connecting bars 21 parallel with the handle bars 14. Transverse connecting bars 22 between the front legs 2 and the back legs 3 are at about the level of the connecting bars 21. The connecting bar 22 between the front legs 1 serves as a stop for a pedal 23. The pedal 23 has suitable bearings such as U-shaped loops 24 on its lower surface around a transverse bearing bar 26. On each end of the bearing bar 26 is a sleeve 27 slidable on the adjacent connecting bar 21. Each sleeve 27 is held in adjusted position by suitable set screws 28 thereby adjustably locating the pedal 23. A plurality of loops 31 are spaced longitudinally along the rear edge of the pedal 23 to receive hooks 32 on the lower ends of respective elastic strips 33. Each elastic strip 33 has a loop 34 at its top end to engage suitable hooks 36 on a bar 37. The bar 37 has sleeves 38 at its ends slidable on the back legs 3 and held in place by set screws 39 to determine the tension of the elastic strips 33.

The front legs 2 and the back legs 3 are screwed into the flanges 1 thereby allowing the removal of front legs and the back legs therefrom and from the respective sleeves so that the device can be shipped disassembled.

In operation the person stands with his feet 41 on the pedals 23 as shown in FIG. 1 with his back against the back padding 8 and his hands gripping the hand bars 14. Then the person braces his back 42 against the back pad 8 and exerts pressure on his heel 43 as shown in FIG. 2. Then ease the pedal 23 back into its original horizontal position as in FIG. 1. By repeating this the user exerts tension to the lower back and leg muscles, and effectively exercises said muscles.

I claim:

1. An exerciser comprising, a frame having an upper portion for receiving the back of a user and a lower portion for receiving the feet of a user, said upper portion being substantially in a plane that is substantially perpendicular to a plane formed by the lower portion, a pedal on the lower portion of the frame, a heel portion on said pedal, a pivot on the lower portion of the frame connected to said pedal spaced from said heel portion thereby to support said pedal rockably about a fixed axis to a position generally in the plane of said lower portion, a back rest on the upper portion of said frame above said heel portion spaced from said heel portion and said pivot axis to correpond to the position of the user's back when standing on said pedal, handle bars on each side of the frame between said pedal and said back rest within reach of the user standing on said pedal, and resilient means connected to the heel portion of said pedal so as to urge said heel portion toward said back rest whereby the user by bracing his back against said back rest and pulling with his hands on said handle bars and depressing while pivoting said heel portion of said pedal about said axis with his heels repeatedly exercising his back muscles.

2. The exerciser specified in claim 1, and an element related to said frame and below said pedal to locate said pedal in said initial position.

3. The exerciser specified in claim 1, and means to adjustably support said back rest on said frame for selected spacing above said pedal.

4. The exerciser specified in claim 3, and adjustable means of connection between said handle members and said frame for adjusting the location of said handle members relative to said back rest.

5. The exerciser specified in claim 1, and adjustable means to support said pedal in selected positions relative to said back rest thereby to regulate the tension of said resilient means.

6. The exerciser specified in claim 5, and said pedal support means being a cross member extended between the connections of the front and rear legs, and pivot support means on said pedal between the front and rear edges of the pedal connected to said cross member.

7. The exerciser specified in claim 6 and, a cross member between the rear legs, a releasable connection at the lower end and at the upper end of the resilient means respectively to connect to the heel portion of said pedal and to said cross member.

8. The exerciser specified in claim 7, and support elements slidable on said extensions of said rear legs adjustably supporting said back rest for locating said back rest at a selected height, securing means on said slidable elements to secure the same in selected position, sleeves on the opposite ends of said cross member slidable on said rear legs, and means to secure the sleeves in adjusted position thereby to determine the tension of said resilient means.

9. An exerciser specified in claim 1, and said frame including spaced front legs and spaced rear legs and connecting members to hold the legs in spaced position, extensions on said rear legs for supporting said back rest, each handle bar being pivoted to the respective front leg and adjustably connected to the respective rear leg.

* * * * *